United States Patent Office 3,749,752
Patented July 31, 1973

3,749,752
OLEFIN HYDROISOMERIZATION PROCESS
Ernest L. Pollitzer, Skokie, and Roy T. Mitsche, Island Lake, Ill., assignors to Universal Oil Products Company, Des Plaines, Ill.
No Drawing. Continuation-in-part of application Ser. No. 802,206, Feb. 25, 1969, which is a continuation-in-part of application Ser. No. 723,896, Apr. 24, 1968. This application Feb. 19, 1971, Ser. No. 117,157
The portion of the term of the patent subsequent to Jan. 4, 1989, has been disclaimed
Int. Cl. C07f 5/02
U.S. Cl. 260—683.9          10 Claims

ABSTRACT OF THE DISCLOSURE

Olefinic hydrocarbons are hydroisomerized to a more branched chain paraffin by contacting the olefin, at hydroisomerization conditions, with a catalytic composite containing a platinum group component and a rhenium component combined with a carrier material containing alumina and finely-divided mordenite prepared by distributing the mordenite in an aluminum sol and gelling the resultant mixture.

CROSS-REFERENCES TO RELATED APPLICATIONS

This application is a continuation-in-part of our copending application, Ser. No. 802,206 filed Feb. 25, 1969, now Pat. No. 3,632,835 which application is a continuation-in-part of our copending application, Ser. No. 723,896 filed Apr. 24, 1968, now U.S. Pat. No. 3,523,914, the teachings of which are specifically incorporated herein.

BACKGROUND OF THE INVENTION

This invention relates to a process for hydroisomerizing isomerizable olefinic hydrocarbons. More particularly, this invention relates to a process for hydroisomerizing isomerizable olefinic hydrocarbons to a more branched paraffin with a catalytic composite comprising a platinum group metallic component and a rhenium component combined with a carrier material containing alumina and finely-divided mordenite.

Isomerization processes for the isomerization of hydrocarbons have acquired significant importance within the petrochemical and petroleum refining industry. For example, the need for branched paraffins such as isobutane or isopentane, as intermediates for the production of high octane motor fuel alkylate, can be met by hydroisomerizing the corresponding linear olefin. Similarly, low octane, linear or slightly branched gasoline boiling range olefins can be converted to more highly branched, high octane paraffins.

SUMMARY OF THE INVENTION

Accordingly, it is an object of this invention to provide a process for hydroisomerizing isomerizable olefinic hydrocarbons. More specifically, it is an object of this invention to provide a hydroisomerization process using a particular isomerization catalyst effective in hydroisomerizing isomerizable olefinic hydrocarbons without introducing undesired decomposition reactions.

In a broad embodiment, this invention relates to a process for hydroisomerizing an isomerizable olefinic hydrocarbon to a more branched paraffin which comprises contacting said olefinic hydrocarbon in admixture with hydrogen at hydroisomerization conditions with a catalytic composite comprising about 0.02 to about 1 wt. percent of a platinum group metallic component and about 0.02 to about 1 wt. percent of a rhenium component combined with a carrier material containing alumina and about 0.5 to about 20 wt. percent of finely divided mordenite, based on said carrier material, said catalytic composite having been prepared by evenly distributing finely-divided mordenite throughout an aluminum hydroxyl chloride sol, gelling the resulting mixture to produce a hydrogel, calcining the resulting hydrogel and impregnating the calcined hydrogel with said platinum group and rhenium components. In a more specific embodiment, these hydroisomerization conditions include a temperature of about 100° C. to about 400° C., a pressure of about 10 atmospheres to about 100 atmospheres, and a hydrogen to hydrocarbon mole ratio of about 2:1 to about 10:1.

Other objects and embodiments referring to alternative isomerizable hydrocarbons and to alternative catalytic compositions will be found in the following further detailed description of the invention.

DESCRIPTION OF PREFERRED EMBODIMENTS

The olefins applicable with the hydroisomerization process of this invention are generally a mixture of olefinic hydrocarbons of approximately the same molecular weight, including the 1-isomer, 2-isomer, and other position isomers, capable of undergoing hydroisomerization to a more branched chain paraffin. Thus, the process of this invention can be used to provide an isoparaffinic feedstock, for motor fuel alkylation purposes by converting a linear olefin such as a $C_4$–$C_5$ linear olefin to isobutane or isopentane. The process of this invention is thereby applicable to the isomerization of such isomerizable olefinic hydrocarbons such as the hydroisomerization of 1-butene, 2-butene, 1-pentene or 2-pentene. Accordingly, it is seen that the process of this invention encompasses the hydroisomerization of olefins wherein the olefin is simultaneously hydrogenated and isomerized to produce a branched or more highly branched chain paraffin such as the exemplified hydroisomerization of a normal pentene (1-pentene, 2-pentene, etc.) to isopentane or the hydroisomerization of a normal hexene (1-hexene, 2-hexene, etc.) to a methyl pentane and/or dimethyl-butanes. It is not intended to limit the scope of this invention to the foregoing enumerated olefinic hydrocarbons nor is it intended to limit the scope of this invention to simply the isomerization of linear olefins to isoparaffins. Included within the scope of this invention is the hydroisomerization of any olefinic hydrocarbon to a branched paraffin wherein the paraffin has a more branched carbon skeleton than the precursor olefin. Likewise, the hydroisomerization of low octane olefinic hydrocarbons to higher octane, more branched paraffins such as the hydroisomerization of a $C_7$–$C_9$ olefin to a higher octane paraffin is included within the generally broad scope of this invention. Preferred is the hydroisomerizion of $C_4$–$C_7$ monoolefins to a corresponding carbon number, more branched chain paraffin.

These foregoing isomerizable olefinic hydrocarbons may be derived as selective fractions from various naturally-occurring petroleum streams either as individual components, or as certain boiling range fractions obtained by the selective fractionation and distillation of catalytically cracked gas oil. Thus, the process of this invention may be successfully applied to and utilized for complete conversion of isomerizable olefins when these isomerizable olefins are present in minor quantities in various fluid or gaseous stream. Thus, the isomerizable olefinic hydrocarbons for use in the process of this invention need not be concentrated and may be in admixture with, for example, paraffins, particularly of the corresponding boiling range. For example, isomerizable olefinic hydrocarbons appear in minor quantities in various refinery streams.

usually diluted with gases such as hydrogen, nitrogen, methane, ethane, propane, etc. These refinery streams containing minor quantities of isomerizable olefinic hydrocarbons are obtained in petroleum refineries and various refinery installations including thermal cracking units, catalytic cracking units, thermal reforming units, coking units, polymerization units, dehydrogenation units, etc. Such refinery offstreams have in the past often been burned for fuel value, since an economical process for the utilization of the olefinic hydrocarbon content has not been available. This is particularly true for refinery fluid streams known as off gas streams containing minor quantities of isomerizable olefinic hydrocarbons.

The catalyst to be used in hydroisomerizing the foregoing isomerizable hydrocarbons comprises a carrier material containing alumina and a crystalline aluminosilicate having combined therewith a platinum group component and a rhenium component. In addition, in some cases, the composite may contain a halogen and/or a sulfur component. It is preferred that the alumina utilized in this catalyst be a porous, adsorptive, high-surface area material having a surface area of about 25 to about 500 or more square meters per gram. Suitable alumina materials are the crystalline aluminas known as gamma-, eta- and theta-alumina, with gamma-alumina giving the best results. In addition, in some embodiments, the carrier material may contain minor proportions of other well-known refractory inorganic oxides such as silica, zirconia, magnesia, etc. However, the preferred carrier material comprises substantially pure gamma alumina containing a minor proportion of a finely-divided aluminosilicate.

It is an essential feature of the catalyst used in this process that the carrier material contains a finely-divided crystalline aluminosilicate. As is well known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra is through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged and allows the association with them of cations in order to maintain electrical balance in the structure. The molecular sieve property of these materials flows from the uniform size of the pores thereof which can be correlated to the size of the molecules that are present in a mixture of molecules and used to separate molecules having a critical diameter less than or equal to the pore mouths of these crystalline aluminosilicates. It is preferred to use crystalline aluminosilicates having pore mouths of at least 5 angstroms in cross-sectional diameter, and more preferably about 5 to about 15 angstrom units. Ordinarily, the aluminosilicates are synthetically prepared in the alkali metal form with one alkali metal cation associated with each aluminum centered tetrahedra. This alkali metal cation may be thereafter ion-exchanged with polyvalent cations such as calcium, magnesium, beryllium, rare earth cations, etc. Another treatment of these alkali metal aluminosilicates involves ion-exchange with ammonium ions followed by thermal treatment, preferably at about 300° F. to convert them to the hydrogen form. When the crystalline aluminosilicates contain a high mole ratio of silica to alumina (for example, above 5), the material may be directly converted to an acid form in a suitable acid medium.

Although in some cases the polyvalent form of the aluminosilicate may be used in the present invention, it is preferred to use the hydrogen form, or a form, for example, the alkali metal form, which is convertable to the hydrogen form during the course of the preferred procedure for incorporation of the crystalline aluminosilicates in the carrier material (explained hereinafter).

The preferred crystalline aluminosilicates are the hydrogen and/or polyvalent forms of synthetically prepared faujasite and mordenite. In fact, we have found best results with synthetic mordenite having an effective diameter of about 6 angstrom units and a mole ratio of silica to alumina of about 9 to 10, and more particularly, the hydrogen form of mordenite.

A particularly preferred crystalline aluminosilicate is acid-extracted mordenite having an $SiO_2/Al_2O_3$ ratio substantially above 10. One method of forming this material involves subjecting the ordinary form of mordenite having a $SiO_2/Al_2O_3$ of about 9 to 10 to the action of a strong acid such as hydrochloric acid, sulfuric acid, nitric acid, etc., at conditions effecting the removal or extraction of at least a portion of the aluminum from the mordenite. Typically this procedure can be used to obtain mordenite having a $SiO_2/Al_2O_3$ ratio of about 11 or more.

Regarding the method of incorporating the crystalline aluminosilicate into the carrier material, we have found that best results were obtained by adding the CAS directly into an aluminum hydroxyl chloride sol prior to its formation in the alumina carrier material. An advantage of this method is the relative ease with which the CAS can be uniformly distributed in the resulting carrier material. Additionally, the sol appears to react with the CAS causing some basic modification of the structure of the resulting material which enables it to have unusual ability to catalyze reactions which depend on carbonium ion intermediates such as cracking, alkylation, isomerization, polymerization, etc.

Accordingly, the preferred method for preparing the carrier material involves forming an aluminum hydroxyl chloride sol by digesting aluminum in HCl to result in a sol having a weight ratio of aluminum to chloride of about 1.0 to about 1.4; evenly distributing the CAS throughout the sol; gelling the resultant mixture to produce a hydrogel or particles of a hydrogel; then finishing the hydrogel into the carrier material by standard aging, washing, drying and calcination steps. See U.S. Pat. No. 2,620,314 for details as to one preferred method of forming the resultant mixture into spherical particles.

The amount of CAS in the resulting carrier material is preferably about 0.5 to about 20 wt. percent and, more particularly, about 1.0 to about 10 wt. percent. By the expression "finely divided" it is meant that the CAS is used in a particle size having an average diameter of about 1 to about 100 microns, with best results obtained with particles of average diameter of less than 40 microns.

Although not essential, it is preferred that the catalyst also contain a halogen component. Although the precise form of the chemistry of the association of the halogen component with the carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the carrier material in any siutable manner, either during preparation thereof or before or after the addition of the catalytically active metallic components. For example, the halogen may be added, at any stage of the preparation of the carrier material or to the calcined carrier material, as an aqueous solution of an acid such as hydrogen fluoride, hydrogen chloride, hydrogen bromide, etc. The halogen component, or a portion thereof, may be composited with the carrier material during the impregnation of the latter with the platinum group component; for example, through the utilization of a mixture of chloroplatinic acid and hydrogen chloride. In another situation, the aluminum hydroxylchloride hydrosol, which is preferably utilized to form the carrier material, contains halogen and thus can contribute some portion of the halogen component to the final composite. In any event, the halogen is preferably composited with the carrier material in such a manner as to result in a final composite that contains about 0.1% to about 1.5% and more preferably about 0.4 to about 0.9% by weight of halogen calculated on an elemental basis.

It is essential that the catalyst contain a platinum group metallic component. Although the process of the present invention is specifically directed to the use of a catalytic composite containing platinum or palladium, it is intended to include other platinum group metals such as rhodium. The platinum group metallic component, such as platinum or palladium may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.02 to about 1% by weight of the final catalytic composite calculated on an elemental basis. Excellent results are obtained when the catalyst contains about 0.3 to about 0.9 weight percent of the platinum group metal.

The platinum group metallic component may be incorporated in the catalytic composite in any suitable manner such as coprecipitation or cogellation with the alumina carrier material, ion-exchange with the alumina hydrogel, or impregnation either after or before calcination of the alumina hydrogel, etc. The preferred method of incorporating this component involves the utilization of water soluble compounds of the platinum group metals with which the carrier material is combined by an impregnation technique. Thus, the platinum group metal may be added to the carrier material by commingling the latter with an aqueous solution of chloroplatinic acid. Other water-soluble compounds of platinum may be employed as impregnation solutions and include ammonium chloroplatinate, platinum chloride, dinitro diamino platinum, etc. The utilization of a platinum chloride compound, such as chloroplatinic acid, is preferred since it facilitates the incorporation of both the platinum component and at least a minor quantity of the preferred halogen component in a single step. Hydrogen chloride is also generally added to the impregnation solution in order to further facilitate the incorporation of the halogen component. In addition, it is generally preferred to impregnate the carrier material after it has been calcined in order to minimize the risk of washing away the valuable platinum metal compounds; however, in some cases, it may be advantageous to impregnate the support when it is in a gelled state. Following the impregnation, the resulting impregnated support is dried and subjected to a high temperature calcination or oxidation technique at a temperatuer of 850° F. to about 1100° F.

Another essential constituent of the catalyst is the rhenium component. This component may be present as an elemental metal, as a chemical compound, such as the oxide, sulfide, halide, or in a physical or chemical association with the alumina carrier material and/or the other components of the catalyst. Generally, the rhenium component is utilized in an amount sufficient to result in a final catalytic composite containing about 0.02 to about 1 wt. percent rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves the impregnation of the carrier material either before, during, or after the other components referred to above are added. The impregnation solution can, in some cases, be an aqueous solution of a suitable rhenium salt such as ammonium perrhenate, sodium perrhenate, potassium perrhenate and the like salts. In addition, aqueous solutions of rhenium halides such as the chlorides may be used if desired; however, the preferred impregnation solution is an aqueous solution of perrhenic acid. In general, the rhenium component can be impregnated either prior to, simultaneously with, or after the platinum group metallic component is added to the carrier material. However, we have found that best results are achieved when the rhenium component is impregnated simultaneously with the platinum group metallic component. In fact, we have determined that an especially preferred impregnation solution contains chloroplatinic acid, hydrogen chloride and perrhenic acid.

In addition, we have determined that an especially preferred catalytic composite is prepared when the weight ratio, calculated on an elemental basis, of the rhenium component to the platinum group metallic component is selected from the range of about 0.05:1 to about 2.75:1, This is particularly true when the total weight content of the rhenium component plus the platinum group metallic component in the catalytic composite is fixed in the range of about 0.2 to about 1.5 wt. percent and more preferably about 0.4 to about 1.0, calculated on an elemental basis. Accordingly, examples of especially preferred catalytic composites are composites containing: 0.1 wt. percent Re+0.65 wt. percent Pt, 0.2 wt. percent Re+0.55 wt. percent Pt, 0.375 wt. percent Re+0.375 wt. percent Pt, 0.55 wt. percent Re+0.20 wt. percent Pt, and 0.65 wt. percent Re+0.10 wt. percent Pt. The exact combination of components are often a function of the feedstock. For example, when processing stocks containing greater than 1 p.p.m. sulfur, a mole ratio of platinum to rhenium greater than unity is preferred. While the foregoing discussion has been directed to platinum and platinum compounds, palladium and the corresponding palladium compounds are likewise equally applicable.

Another constituent of the catalyst of the present invention may be a technetium component either in place of or in conjunction with rhenium. This component may be present as an elemental metal, as a chemical compound, such as the oxide, sulfide, halide, or in a physical or chemical association with the alumina support and/or the other components of the catalyst. Generally, the technetium component is utilized in an amount sufficient to result in a final catalytic composite containing about 0.01 to about 1 wt. percent technetium calculated as elemental metal. The technetium component may be incorporated in the catalytic composite in any suitable manner and at any stage in the preparation of the catalyst. As a general rule, it is advisable to introduce the technetium at a later step of the preparation in order that the expensive metal will not be lost due to subsequent processing involving washing and purification treatments. The preferred procedure for incorporating the technetium component involves the impregnation of the alumina carrier material either before, during, or after the other components referred to above are added. The impregnation solution can in some cases be an aqueous solution of a suitable acidic technetium salt such as an aqueous solution of a technetium halide sch as the chloride; however, the preferred impregnation solution is an aqueous solution of pertechnic acid ($HTcO_4$). In general, the technetium component can be impregnated either prior to, simultaneously with, or after the platinum group metallic component is added to the support. However, best results are achieved when the technetium component is impregnated simultaneously with the platinum group metallic component. In fact, a preferred impregnation solution contains chloroplatinic acid, hydrogen chloride, and pertechnic acid.

As is well known to those skilled in the art, technetium is an artificially prepared element that apparently does not exist in nature. Recently, it has become available in commercial quantities from the Atomic Energy Commission because it is one of the by-products formed during the operation of a nuclear fission reactor. The isotope of technetium which is preferred for use in the present invention is the one with an atomic weight of 99; it is radioactive and is reported to possess a half-life of about $4.7 \times 10^{+5}$ years. Naturally, suitable safeguards designed to protect against radioactivity must be used both during the preparation of the catalyst of the present invention and the use thereof in the conversion of hydrocarbons.

Regardless of the details of how the components of the catalyst are composited with the alumina carrier material, the final catalyst generally will be dried at a temperature of from about 200° F. to about 600° F. for a period of from about 2 to 24 hours or more and finally oxidized at a temperature of about 700° F. to about 1100° F. for a period of about 0.5 to 10 hours, and preferably about 1 to about 5 hours. This oxidation step is preferably performed in the presence of air having a minor amount of chloride present therein.

It is preferred that the resultant calcined catalytic composite be subjected to a substantially water-free reduction prior to its use in the conversion of hydrocarbons. This step is designed to insure a uniform and finely-divided dispersion of the metallic component throughout the alumina carrier material. Preferably, substantially pure and dry hydrogen (i.e. less than about 20 vol. p.p.m. $H_2O$) is used as the reducing agent in this step. The reducing agent is contacted with the calcined catalyst at a temperature of about 800° F. to about 1200° F. and for a period of time of about 0.5 to about 10 hours or more effected to substantially reduce both metallic components to their elemental state. This reduction treatment may be performed in situ as part of a start-up sequence if precautions are taken to predry the plant to a substantially water-free state and if substantially water-free hydrogen is used.

Although it is not essential, the resulting reduced catalytic composite may, in many cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower mocular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more.

According to the present invention, the isomerizable olefinic hydrocarbon charge stock and hydrogen are contacted with a catalyst of the type described above in a hydroisomerization zone at hydroisomerization conditions. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into a hydroisomerization zone containing a fixed bed of the catalyst type previously characterized. It is, of course, understood that the isomerization zone may be one or more separate reactors with suitable means therebetween to insure that the desired isomerization temperature is maintained at the entrance to each reactor. It is also to be noted that the reactants may be contacted with the catalys bed in either upward, downward, or radial flow fashion. In addition, it is to be noted that the reactants may be in the liquid phase, a mixed liquid-vapor phase, or a vapor phase when they contact the catalyst with best results obtained in the vapor phase.

The process of this invention, utilizing the catalyst hereinbefore set forth, for hydroisomerizing isomerizable olefinic hydrocarbons is preferably effected in a continuous flow, fixed bed system. One particular method is continuously passing the hydrocarbon, in admixture with hydrogen, to a reaction zone containing the catalyst and maintaining the zone at proper hydroisomerization conditions. When effecting the hydroisomerization reaction, (i.e., the conversion of the olefin to a branched or more highly branched paraffin) hydrogen to hydrocarbon mole ratios of at least 1:1 are preferred. Particularly preferred are hydrogen to hydrocarbon mole ratios of 2:1 to about 10:1 or more. The hydrocarbon is passed over the catalyst at a liquid hourly space velocity (defined as volume of liquid hydrocarbon passed per hour per volume of catalyst) of from about 0.1 to about 20 hr.$^{-1}$ or more. In addition, diluents such as argon, nitrogen, etc., may be present. The hydroisomerized product is continuously withdrawn, separated from the reactor effluent, and recovered by conventional means, preferably fractional distillation, while the unreacted starting material may be recycled to form a portion of the feedstock. Particular conditions to be utilized for the hydroisomerization of olefins to a more branched paraffin include temperatures of about 0° C. to about 500° C., and pressures of about atmospheric to about 200 atmospheres. Preferred conditions for hydroisomerization, however, include pressures of 10 to 100 atmospheres, temperature of 100° C. to about 400° C., and hydrogen to hydrocarbon mole ratios of about 2:1 to about 10:1 or more. In effect, hydrogenating as well as isomerization conditions are to be attained simultaneously in hydroisomerization in a manner well known to those trained in the art.

ILLUSTRATIVE EMBODIMENTS

The following illustrative embodiments are given to illustrate the preparation of the catalyst composite to be utilized in the process of this invention and its use in the isomerization of isomerizable olefinic hydrocarbons. However, these illustrations are not presented for purposes of limiting the scope of this invention but in order to further illustrate the embodiments of the present process.

ILLUSTRATION I

Aluminum metal, having a purity of 99.99 wt. percent is digested in hydrochloric acid to produce an aluminum hydroxylchloride sol having a weight ratio of Al/Cl of about 1.15 and a specific gravity of 1.3450. An aqueous solution containing 28 wt. percent HMT (i.e. hexamethylenetetramine) is made up, and 700 cc. of the HMT solution is then added to 700 cc. of the sol to form a dropping solution. About 10 grams of the hydrogen form of mordenite in the form of a fine powder is added to the resulting dropping solution and uniformly distributed therein. Another portion of the mordenite is chemically analyzed and contains 11.6 wt. percent $Al_2O_3$, 87.7 wt. percent $SiO_2$ and 0.2 wt. percent Na. Still another portion of the mordenite is analyzed for particle size distribution. The results show that 57.6 wt. percent of the powder is between 0 to 40 microns in size and 82.1 wt. percent of the powder is between 0 and 60 microns in size.

The dropping solution containing the dispersed mordenite is passed through a vibrating dropping head and dropped in discrete particles into a forming oil maintained at 95° C. The rate of vibration and the volumetric flow of dropping solution is set to produce finished spherical particles of about 1/16 inch in diameter. The dropped particles are aged in oil overnight (about 16 hours), separated from the oil and aged in an ammoniacal solution at 95° C. for about 3 hours. The aged spherical particles are then water washed to remove neutralization salts and dried. The particles are thereupon calcined at 600° C. for 4 hours in dry air to give a carrier material having an apparent bulk density of between 0.4 and 0.5 gm./sec.

About 350 cc. of the carrier material is placed in a steam jacketed rotating vessel and 250 cc. of an impregnation solution containing chloroplatinic acid, perrhenic acid and HCl is added thereto. The vessel is rotated until all the liquid solution is evaporated. The catalyst particles are then oxidized at a temperature of about 1025° F. to produce a finished catalyst containing, on an elemental basis, 0.55 wt. percent platinum, about 0.75 wt. percent chloride and about 0.2 wt. percent rhenium, combined with an alumina carrier material containing about 5 wt. percent of the hydrogen form of the mordenite-type crystalline aluminosilicate.

ILLUSTRATION II

A portion of the catalyst as prepared in Illustration I is charged to an appropriate hydroisomerization reactor maintained at a temperature of about 220° C. and a pressure of about 450 p.s.i.g. A 4:1 hydrogen to 2-pentene mole ratio charge stock continuously passed to the reactor with a conversion to isopentane observed.

ILLUSTRATION III

A further portion of the catalyst as prepared in Illustration I is charged to a conventional pilot plant maintained at a temperature of about 300° C. and a pressure of 600 p.s.i.g. A 5:1 hydrogen to 1-butene/2-butene mole ratio charge stock is continuously passed to the reactor with conversion to isobutane observed.

We claim as our invention:

1. A process for the conversion of an isomerizable olefinic hydrocarbon to a more branched-chain paraffin which comprises contacting said olefinic hydrocarbon, in admixture with hydrogen, at hydroisomerization conditions, with a catalytic composite comprising about 0.02 to about 1 wt. percent of a platinum group metallic component and about 0.02 to about 1 wt. percent of a rhenium component combined with a carrier material containing alumina and about 0.5 to about 20 wt. percent of finely divided mordenite based on said carrier material said mordenite selected from the group consisting of acid extracted mordenite having a silica to alumina ratio greater than 11 and the hydrogen form of mordenite, said catalytic composite having been prepared by evenly distributing finely divided mordenite throughout an aluminum hydroxyl chloride sol, gelling the resulting mixture to produce a hydrogel, calcining the resulting hydrogel and impregnating the calcined hydrogel with said platinum group and rhenium components.

2. The process of claim 1 further characterized in that said platinum group component is platinum, palladium or compounds thereof.

3. The process of claim 1 further characterized in that said catalyst contains from about 0.1% to about 1.5% fluorine or chlorine.

4. The process of claim 1 further characterized in that said catalyst contains a sulfur component.

5. The process of claim 1 further characterized in that said isomerization conditions include a temperature of about 100° C. to about 400° C. and a pressure of about 10 atmospheres to about 100 atmospheres.

6. The process of claim 1 further characterized in that said hydrocarbon is commingled with about 2 to about 10 moles of hydrogen per mole of hydrocarbon.

7. The process of claim 1 further characterized in that said olefinic hydrocarbon is a $C_4$-$C_7$ mono-olefin.

8. The process of claim 1 further characterized in that said olefinic hydrocarbon is a butene and said paraffin is an isobutane.

9. The process of claim 1 further characterized in that said olefinic hydrocarbon is a pentene and said paraffin is a branched-pentane.

10. The process of claim 1 further characterized in that said olefinic hydrocarbon is a hexene and said paraffin is a branched hexane.

References Cited

UNITED STATES PATENTS

| | | | |
|---|---|---|---|
| 3,632,835 | 1/1972 | Mitsche et al. | 260—666 |
| 3,271,294 | 9/1966 | Kelley | 260—683.65 |
| 3,296,118 | 1/1967 | Czajkowski et al. | 208—138 |

DANIEL E. WYMAN, Primary Examiner

A. P. DEMERS, Assistant Examiner

U.S. Cl. X.R.

208—138, 139; 260—683.65, 683.68, 676